United States Patent
Dazé

(10) Patent No.: US 10,621,778 B2
(45) Date of Patent: Apr. 14, 2020

(54) METHODS AND SYSTEMS FOR GENERATING DYNAMIC USER INTERFACE EFFECTS

(71) Applicant: FARADAY & FUTURE INC., Gardena, CA (US)

(72) Inventor: Nicholas William Dazé, Los Angeles, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 20 days.

(21) Appl. No.: 15/336,853

(22) Filed: Oct. 28, 2016

(65) Prior Publication Data

US 2017/0124756 A1 May 4, 2017

Related U.S. Application Data

(60) Provisional application No. 62/248,485, filed on Oct. 30, 2015.

(51) Int. Cl.
  *G06T 15/60*  (2006.01)
  *G06F 3/0346*  (2013.01)
  *G06T 15/50*  (2011.01)

(52) U.S. Cl.
  CPC ........... *G06T 15/60* (2013.01); *G06T 15/503* (2013.01); *G06T 15/506* (2013.01); *G06T 2200/24* (2013.01)

(58) Field of Classification Search
  None
  See application file for complete search history.

(56) References Cited

U.S. PATENT DOCUMENTS

| | | | |
|---|---|---|---|
| 8,291,345 B2 | 10/2012 | Howard | |
| 8,384,537 B1 | 2/2013 | Simmons | |
| 2006/0279959 A1 | 12/2006 | Yabashi et al. | |
| 2010/0103172 A1* | 4/2010 | Purdy, Sr. | G06T 15/50 345/426 |
| 2014/0208263 A1 | 7/2014 | Maklouf | |
| 2014/0285477 A1* | 9/2014 | Cho | G09G 3/2003 345/207 |
| 2015/0085124 A1 | 3/2015 | Poppe et al. | |

FOREIGN PATENT DOCUMENTS

| | | |
|---|---|---|
| JP | 2010288199 A | 12/2010 |
| JP | 2014130249 A | 7/2014 |
| JP | 2015231828 A | 12/2015 |

OTHER PUBLICATIONS

PCT Search Report & Written Opinion for Application No. PCT/US2017/030273, dated Aug. 17, 2017, 13 pgs.

* cited by examiner

*Primary Examiner* — Edward Martello
(74) *Attorney, Agent, or Firm* — Veros Legal Solutions, LLP

(57) ABSTRACT

A method of generating dynamic user interface effects may include receiving positioning data indicative of a location of the user interface and receiving orientation data indicative of an orientation of the user interface. The method may also include determining a location of a light source relative to the user interface based on the positioning data and the orientation data, and modifying an image on the user interface based on the location of the light source.

20 Claims, 4 Drawing Sheets

METHODS AND SYSTEMS FOR GENERATING DYNAMIC USER INTERFACE EFFECTS

CROSS REFERENCE TO RELATED APPLICATIONS

This application claims the benefit of priority from U.S. Provisional Patent Application No. 62/248,485 filed on Oct. 30, 2015, the entire disclosures of which is incorporated by reference.

TECHNICAL FIELD

The present disclosure relates generally to methods and systems for generating user interface effects, and more particularly, to methods and systems for dynamically generating user interface effects based on real world lighting conditions.

BACKGROUND

User interfaces display information and provide images to facilitate input from the user to transmit data or initiate certain actions. Designers attempt to display the user interfaces in a manner that creates an intuitive interaction with the user. In some instances, designers have attempted to incorporate optical effects to provide structure, order, and visual hierarchy to the user. In some instances, user interface design has attempted to incorporate effects designed to simulate three-dimensional objects in two dimensions.

For example, drop shadows are generated on user interfaces by defining a fixed angle and fixed opacity to simulate a shadow. For instance, a designer might specify that a shadow is 20% opaque, at a 90° angle below a simulated button, and offset by 2 pixels on a y-axis. However, these values are hard-coded and exported as a static image asset to be included in the user interface. The static nature of the image asset prevents the interface element from reacting dynamically to changing light conditions and/or orientations.

The disclosed methods and systems may be directed to mitigating or overcoming one or more of the problems set forth above and/or other problems in the prior art.

SUMMARY

One aspect of the present disclosure is directed to a method for generating dynamic user interface effects. The method may include receiving positioning data indicative of a location of the user interface and receiving orientation data indicative of the orientation of the user interface. The method may also include determining a location of a light source relative to the user interface based on the positioning data and the orientation data, and dynamically modifying an image on the user interface based on the location of the light source.

Another aspect of the present disclosure is directed to a system for generating dynamic user interface effects. The system may include an interface configured to receive positioning data indicative of a location of the user interface and orientation data indicative of an orientation of the user interface. The system may also include a processing unit configured to determine a location of a light source relative to the user interface based on the positioning data and the orientation data, and modify an image on the user interface based on the location of the light source.

Yet another aspect of the present disclosure is directed to a vehicle. The vehicle may include a user interface and a system. The system may include an interface configured to receive positioning data indicative of a location of the user interface and orientation data indicative of an orientation of the user interface. The control interface may also include a processing unit configured to determine a position of a light source relative to the user interface based on the positioning data and the orientation data, and modify an image on the user interface based on the relative position of the light source.

DETAILED DESCRIPTION

The disclosure is generally directed to methods and systems configured to dynamically adjust visual effects on a user interface based on changing real world conditions. In some embodiments, the disclosure is directed to estimating the geographic location and orientation of the user interface and determining the relative location and intensity of a light source (e.g., the sun or the moon). Used herein, intensity of a light source refers to the intensity of the light emitted, reflected, or otherwise provided by the light source. The disclosure may be applied to many different applications, such as a user interface in a moving vehicle.

Figure 1:
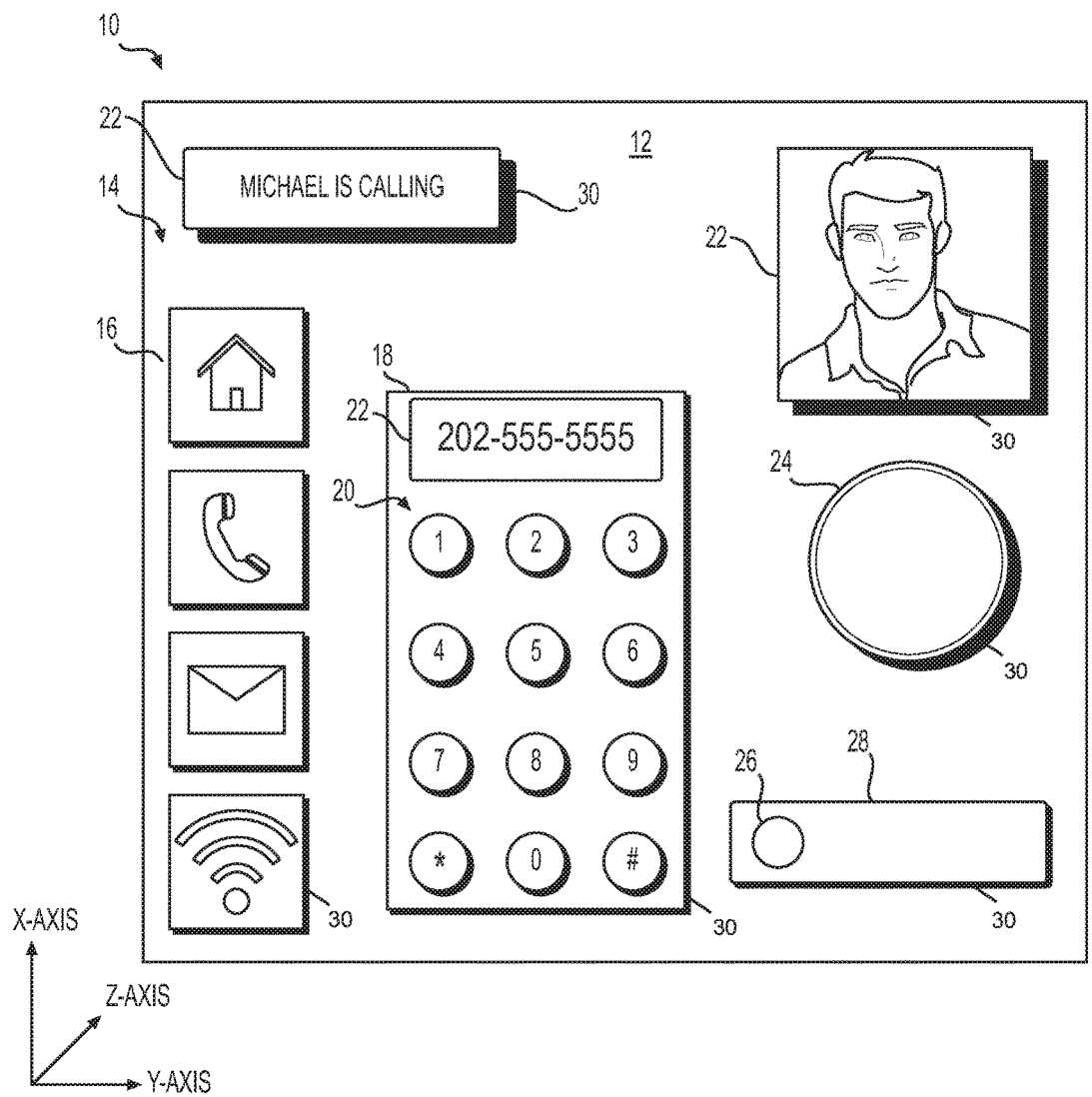
FIG. 1 is a diagrammatic illustration of an exemplary user interface according to an exemplary embodiment.

FIG. 1 is a diagrammatic illustration of a user interface 10. User interface 10 may be configured to receive input from the user and transmit data. For example, user interface 10 may include a display such as an LCD, an LED, a plasma display, or any other type of display, and provide a Graphical User Interface (GUI) presented on the display for user input and data display. The display may include a number of different types of materials, such as plastic or glass, and may be touch-sensitive to receive commands from the user. For example, the display may include a touch-sensitive material that is substantially rigid, such as Gorilla Glass™, or substantially pliable, such Willow Glass™. User interface 10 may be included in a vehicle, a smart phone, a tablet, and/or wearable technology, such as a smart watch or smart glasses.

As illustrated in FIG. 1, exemplary user interface 10 may include an array of pixels configured to depict a background 12 on which a number of features 14 are displayed. For example, in some embodiments, user interface 10 may include a number of icons 16 that may provide the user with shortcuts to a number of programs, such as a home icon, a phone icon, an email icon, and a network icon. When selecting the phone icon, for example, a window 18 may open that provides a keyboard 20 and a data field 22 which may, for example, allow operation of a cellular network. Icons 16 and keyboard 20 may be actuated by pressing the respective portion of the display. When selecting the network icon, user interface 10 may provide access to web browser. User interface 10 may also include a simulated knob 24, which may be actuated by a rotational movement of the user. User interface 10 may further include a simulated slider switch 26, which may be dragged along a groove 28 depicted on the display. User interface 10 may include other data fields to receive data, for example, from an incoming phone call. User interface 10 may define Cartesian coordinates, such as x-, y-, and z-coordinates.

As illustrated in FIG. 1, features 14 of user interface 10 may have a variety of different shapes and sizes in order to improve ease of differentiation and/or operation. Features 14 may have an image shape and size along the x/y coordinates that is depicted on the plane of user interface 10. For example, simulated knob 24 may appear as a large round shape to encourage rotation by a finger of the user. On the other hand, icons 16 may be relatively smaller and square shaped because icons 16 relate to activating or de-activating a program rather than adjusting an adjustable feature such as volume. In order to enhance the simulation of three-dimensional characteristics of the icons, features 14 may also be configured to have an apparent height extending in the z-axis away from background 12.

The apparent height of features 14 may be depicted with design features, such as modifying the contrast of images on and/or around feature 14. For example, if feature 14 was designed with an arcuate surface extending in the z-plane, at least a portion of the periphery of feature 14 may be provided a gradient of shading to simulate an apparent light source hitting an elevated portion of the surface prior to the periphery. Depending on its shape, feature 14 may also cast a shadow 30 onto other components of user interface 10, such as adjacent portion of background 12 and/or proximate features 14. Shadow 30 may be determined by the relative size of features 14. For example, features 14 that have a larger dimension (or that are elevated) in at least one of the x-, y-, and z-axes may produce a larger shadow 30. Depending on the size of shadow 30, larger features 14 may block the apparent light source from smaller features 14. It is also contemplated that the size of features 14 may change in order to highlight aspects of user interface 10. For example, when user interface 10 is receiving an incoming phone call, data fields 22 having data pertaining to the phone call may enlarge or be raised along the z-axis to become more prominent, casting a larger shadow 30 compared to other features 14.

Shadow 30 extending from features 14 may also be simulated based on a location and/or intensity of an apparent light source. In some embodiments, the angle of shadow 30 may be calculated based on an angle of the apparent light source relative to the x-, y-, and z-axes of user interface 10. For example, shadow 30 may be simulated according to tangential lines extending from the apparent light source to the edges of feature 14, and extending the lines further to intersect with the x/y plane of background 12 and/or an adjacent feature 14. The outline of shadow 30 may then be simulated by the accumulation of the intersecting points of background 12 and/or adjacent features 14. Therefore, the number of pixels of shadow 30 may be geometrically calculated based on an angle of the apparent light source and dimensions of features 14. For example, smaller angles of the apparent light source (e.g., smaller z-axis coordinate) and larger sizes of feature 14 may increase the number of pixels in simulated shadow 30.

The image of shadow 30 may also be simulated based on the intensity of the apparent light source, such that an increased intensity may create darker and more defined shadows 30. For example, apparent light sources with a low intensity may generate shadows 30 having opacity of about 20%, while apparent light sources with a higher intensity may generate shadows 30 having opacity of about 80%. The relationship of the intensity of the apparent light source with the opacity of shadow 30 may be determined by, for example, a look-up table. Furthermore, each feature 14 may provide different shadows 30 depending on the location of the apparent light source. For example, if the apparent light source is located overhead user interface 10 between first and second features 14 along the x-axis, shadows 30 for first and second features 14 may extend in opposite directions along the x-axis. In some embodiments, the apparent light source may be designed to simulate real world lighting conditions.

Figure 2:
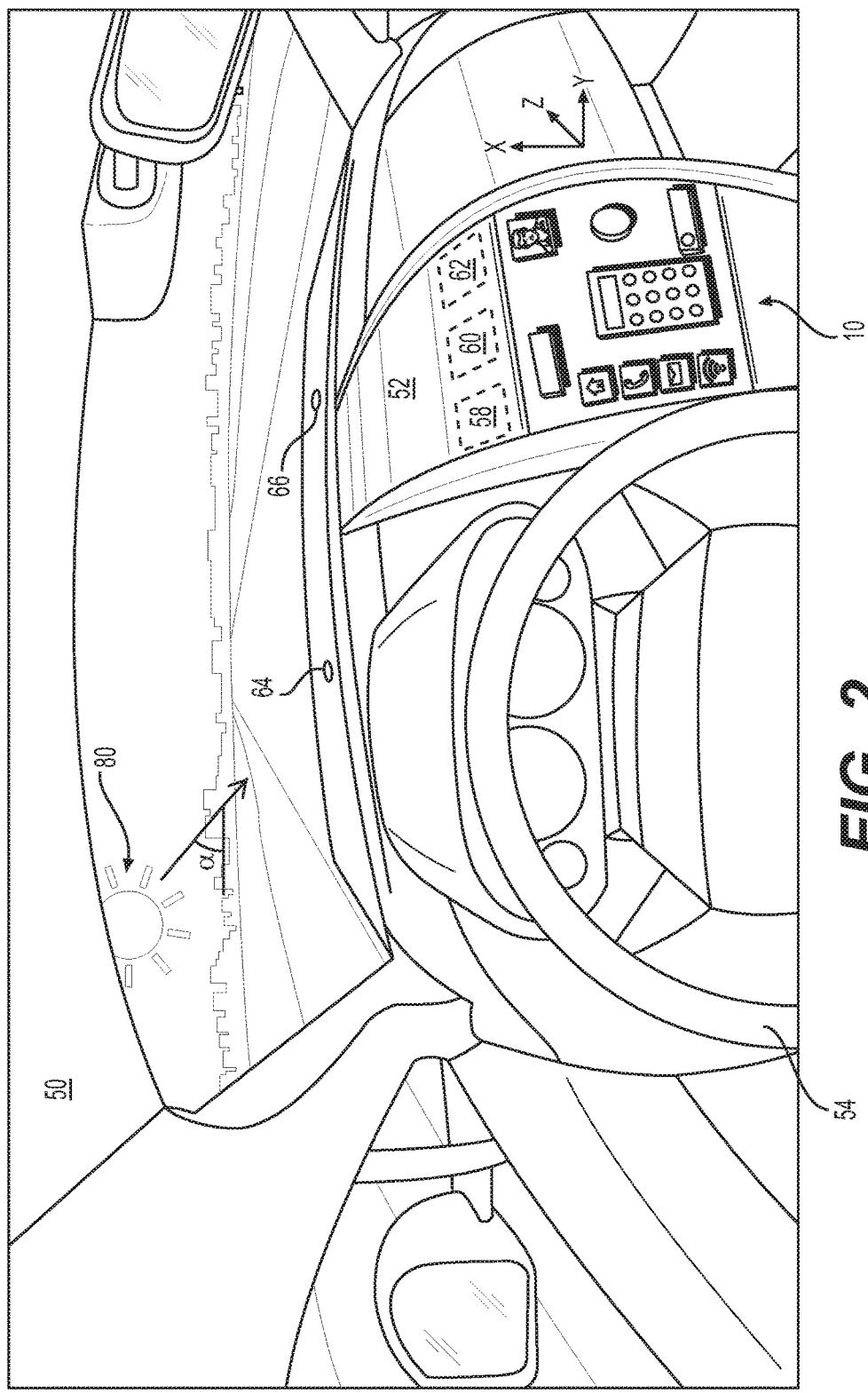
FIG. 2 is a diagrammatic illustration of an exemplary embodiment of an interior of an exemplary vehicle that may house the exemplary user interface of FIG. 1 according to an exemplary embodiment.

FIG. 2 is an exemplary embodiment of an exemplary vehicle 50. Vehicle 50 may have any body style, such as a sports car, a coupe, a sedan, a pick-up truck, a station wagon, a sports utility vehicle (SUV), a minivan, or a conversion van. Vehicle 50 may be an electric vehicle, a fuel cell vehicle, a hybrid vehicle, or a conventional internal combustion engine vehicle. Vehicle 50 may be configured to be operated by a driver occupying vehicle 50, remotely controlled, and/or autonomous. Vehicle 50 may be subject to a light source (e.g., the sun or the moon) 80 emitting light at an elevation angle, $\alpha$, relative to the horizon, and at an azimuth angle, $\beta$ (not shown), relative to an azimuth direction (e.g., due north). As further illustrated in FIG. 2, vehicle 50 may have a dashboard 52 from which a steering wheel 54 may project, and user interface 10. Vehicle 50 may also include a number of sensors, such as an accelerometer 58, a gyroscope 60, a barometer 64, and a light sensor 66.

Accelerometer 58 may be configured to determine static acceleration (e.g., gravity) and/or dynamic acceleration (e.g., sudden starts/stops) of user interface 10. For example, if user interface 10 is stationary, accelerometer 58 may be configured to sense orientation data related to an orientation of user interface 10 by sensing gravity. In some embodiments, accelerometer 58 may include a sensor configured to measure the acceleration of a mass relative to a reference point. The sensor may include piezoelectric, piezoresistive, and/or capacitive elements configured to convert a mechanical force generated by the motion of the mass into an electric signal indicative of accelerations of user interface 10.

Gyroscope 60 may be configured to determine an angular velocity of user interface 10 relative to the x-, y-, and z-axes. In some embodiments, gyroscope 60 may include an off-center mass that is shifted radially as the orientation and angular velocity of user interface 10 changes. The sensor may include piezoelectric, piezoresistive, and/or capacitive elements configured to convert a mechanical force from the motion of the mass into an electric signal indicative of the angular velocity of user interface 10. In some embodiments, accelerometer 58 and gyroscope 60 may be positioned on the same circuit board. For example, accelerometer 58 and gyroscope 60 may be positioned in circuitry of either user interface 10 and/or an onboard computer of vehicle 50. The signal of accelerometer 58 and the signal of gyroscope 60 may be used in combination to improve the accuracy and detail of the orientation data. For example, circuitry may include a filter that receives both the signal of accelerometer 58 and the signal of gyroscope to generate a signal indicative of the orientation data.

Compass 62 may, additionally or alternatively, be used to determine the orientation of user interface 10 according to at least one axis. For example, compass 62 may include magnets that interact with the planetary magnetic field to detect the azimuth direction and determine orientation data indicative of the relative orientation of x-, y-, and z-axis of user interface 10. Compass 62 may also be configured to generate a signal according to the orientation data.

Barometer 64 may be configured to measure the local air pressure of user interface 10. In some embodiments, barometer 64 may include a piezoelectric, piezoresistive, and/or capacitive elements that expands (as the pressure falls) or contracts (as the pressure rises) and generates corresponding electric signals indicative of the local air pressure of user interface 10. The altitude of user interface 10 may then be determined based on the air pressure measured by barometer 64 according to look-up tables and/or calculations. Barometer 64 may be positioned anywhere relative to user interface 10. Barometer 64 may be positioned on an exterior surface of vehicle 50 (e.g., on a hood or roof) or interior of vehicle 50 (e.g., in housing of user interface 10).

Light sensor 66 may include a number of different mechanisms configured to measure the light received from light source 80. In some embodiments, light sensor 66 may include one or more of photocells, phototransistors, photovoltaic cells, light emitting diodes (LEDs), and/or active-pixel sensors (APSs). For example, light sensor 66 may include APSs consisting of an integrated circuit containing an array of pixel sensors. The light from light sensor 66 may generate a voltage across the APSs which may be measured to determine the intensity of light source 80. The array of sensors may also be configured to detect an angle of light source 80 relative to the array of sensors. Light sensor 66 may also be configured to generate an electric signal indicative of the intensity and/or angle of light source 80 relative to user interface 10. Light sensor 66 may be positioned on an exterior surface, such as, on a hood or roof of vehicle 50. Light sensor 66 may advantageously be configured to determine instantaneous changes in light source 80, such as when light source 80 moves from a relatively obstructed location (e.g., behind clouds) to a relatively unobstructed location, and vice versa. Furthermore, since the accuracy of light source 64 may be compromised because of other obstructions (e.g., dirt, dust, and/or paint), the signal generated by light sensor 66 may be adjusted (e.g., normalized) relative to recorded weather data.

Figure 3:
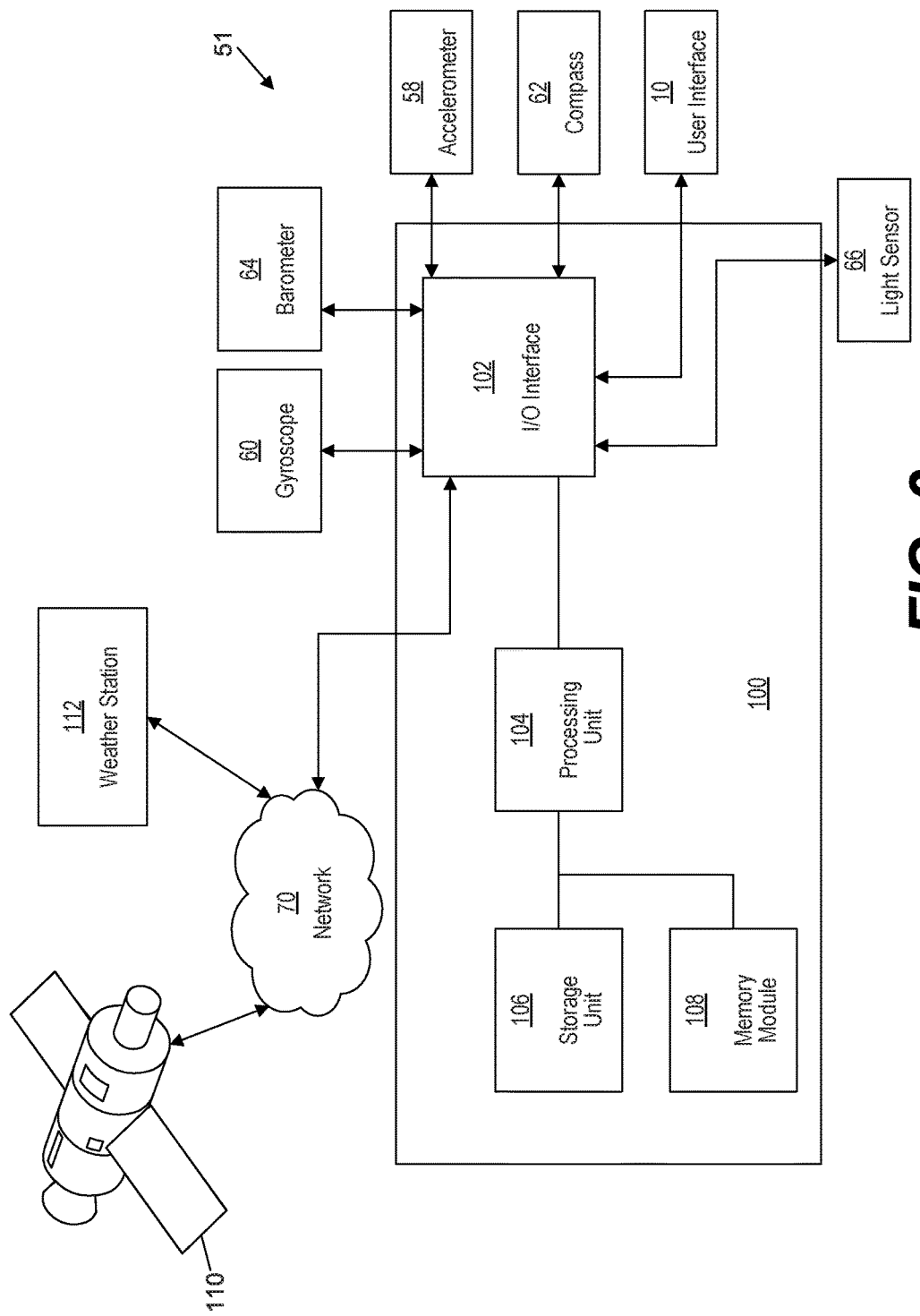
FIG. 3 is a block diagram of an exemplary system that may be used with the exemplary vehicle of FIG. 2 according to an exemplary embodiment.

FIG. 3 provides a block diagram of an exemplary system 51 that may be used in accordance with a method of controlling operation of user interface 10. As illustrated in FIG. 3, system 51 may include a controller 100 having, among other things, an I/O interface 102, a processing unit 104, a storage unit 106, and a memory module 108. One or more of the components of controller 100 may be installed in user interface 10 and/or in an on-board computer of vehicle 50. These units may be configured to transfer data and send or receive instructions between or among each other.

I/O interface 102 may be configured for two-way communication between controller 100 and various components of system 51, such as user interface 10, accelerometer 58, gyroscope 60, compass 62, barometer 64, and/or light sensor 66. I/O interface 102 may also be configured to send and receive operating signals to and from satellite 110 and weather station 112. I/O interface 102 may send and receive the data between each of the devices via communication cables, wireless networks, or other communication mediums For example, satellite 110 and weather station 112 may be configured to send and receive signals to I/O interface 102 via a network 70. Network 70 may be any type of wired or wireless network that may allow transmitting and receiving data. For example, network 70 may include radio waves, a nationwide cellular network, a local wireless network (e.g., Bluetooth™ or WiFi), and/or a wired network. Processing unit 104 may be configured to receive signals and process the signals to determine real world lighting conditions. Processing unit 104 may also be configured to generate and transmit command signals, via I/O interface 102, in order to actuate the devices in communication.

In some embodiments, processing unit 104 may be configured to determine a geographic position of user interface 10. For example, processing unit 104 may be configured to lock onto a plurality of satellites 110 in order to triangulate the current latitude, longitude, and/or altitude, for example, with a global positioning system (GPS). Processing unit 104 may also be configured to compare the determined position to locations of natural and man-made structures that may affect the lighting of user interface 10 and/or vehicle 50. For example, processing unit 104 may be configured to determine position of user interface 10 relative to elevated regions (e.g., mountains), tunnels, large buildings, and landscape (e.g., trees). In some embodiments, processing unit 104 may, additionally or alternatively, be configured to determine the altitude of user interface 10 based on a signal generated by barometer 64. Barometer 64 may provide more accurate data regarding the altitude of user interface 10 according to local air pressure measurements.

Processing unit 104 may also be configured to determine orientation data pertaining to the orientation of the x-, y-, and z-axes of user interface 10, for example, relative to the azimuth direction. In some embodiments, processing unit 104 may be configured to determine the orientation based on the GPS data. For example, when user interface 50 is moving at a rate of speed, processing unit 104 may be configured to analyze the current and previous positions of user interface 10 to determine current orientation data of user interface 10. However, orientation data extracted from the GPS data may not be accurate, especially at low rates of speed; therefore processing unit 104 may be configured to determine the orientation data, additionally or alternatively, through signals generated by local sensors, such as accelerometer 58, gyroscope 60, and/or compass 62. For example, processing unit 104 may be configured to use one or more of local sensors 58, 60, 62 to determine orientation of the x-, y-, and z-axes of user interface 10 based on the acceleration of gravity and/or the planetary magnetic field.

Processing unit 104 may be configured to query weather station 112 to determine local atmospheric conditions. For example, processing unit 104 may be configured to acquire data from weather station 112 pertaining to the position of light source 80, such as the elevation angle, α, and azimuth angle, β. Processing unit 104 may, additionally or alternatively, be configured to determine the location of light source 80 based on solar charts and/or lunar charts stored as look-up tables in storage unit 106 and/or memory module 108. For example, processing unit 104 may be configured to calculate the exact position of light source 80 according to the specific date, time, and/or geographic position based on the solar charts and/or lunar charts. Processor 104 may be further configured to query weather station 112 to determine other local atmospheric conditions, such as the local solar intensity and conditions that may reduce the solar intensity, such as cloud coverage and/or air quality (e.g., pollution). In certain circumstances, processing unit 104 may be configured to determine the local atmospheric conditions based on other mechanisms, such as local sensors. For example, when it is determined that the weather conditions are "partly cloudy" such that the received intensity of light source 80 may change instantaneously, processing unit 104 may be configured to determine the instantaneous light intensity based on signals generated by light sensor 66.

Processing unit 104 may be configured to dynamically modify an image on user interface 10 based on the location of light source 80. In some embodiments, processing unit 104 may be configured to project elevation angle, α, and azimuth angle, β, of light source 80 onto x-, y-, and z-axes of user interface 10. For example, processing unit 104 may be configured to geometrically convert the elevation angle, α, and azimuth angle, β, of light source 80 to determine a location of an apparent light source according to the x-, y-, and z-axes of user interface 10. Processing unit 104 may be configured to generate an outline of shadow 30 projecting from at least one feature 14 according to the apparent light source. For example, processing unit 104 may be configured to simulate lines extending from the apparent light source to the edges of features 14, and extending the simulated lines further to intersect with the x/y plane of background 12 and/or an adjacent feature 14.

Processing unit 104 may also be configured to determine the opacity of shadow 30 based on an apparent intensity of light source 80. For example, processing unit 104 may be configured to determine an intensity of light source 80 based on at least one of acquired data from weather station 112, signals generated by light sensor 64, and/or a calculated distance of light source 80 based on, for example, the time of year, latitude, longitude, and/or altitude. Based on the determined intensity of light source 80, processing unit 104 may be configured to correlate the opacity of shadow 30 according to look-up tables stored in storage unit 106 and/or memory module 108. Processing unit 104 may then be configured to provide shading of shadow 30 based on the determined opacity.

At times when light source 80 is physically located behind user interface 10, system 51 may perform a number of different functions. In some embodiments, processing unit 104 may be configured to overlay shadow 30 on top of feature 14 to provide a realistic effect of light source 80. However, in some embodiments, processing unit 104 may be configured to project shadow 30 behind features 14 onto background 12 even when light source 80 is behind background 12, in order to ensure visibility of features 14.

Storage unit 106 and/or memory module 108 may be configured to store one or more computer programs that may be executed by controller 100 to perform functions of system 11. For example, storage unit 106 and/or memory module 108 may be configured to store GPS software configured to determine geographic positioning based on communication with satellites 110. Storage unit 106 and/or memory module 108 may also be configured to store data and/or look-up tables used by the processing unit. For example, storage unit 106 and/or memory module 108 may be configured to store data pertaining to the size and location of features 14 on user interface 10. Storage unit 106 and/or memory module 108 may also be configured to store look-up tables correlating the intensity of light source 80 to opacity of shadow 30.

Figure 4:
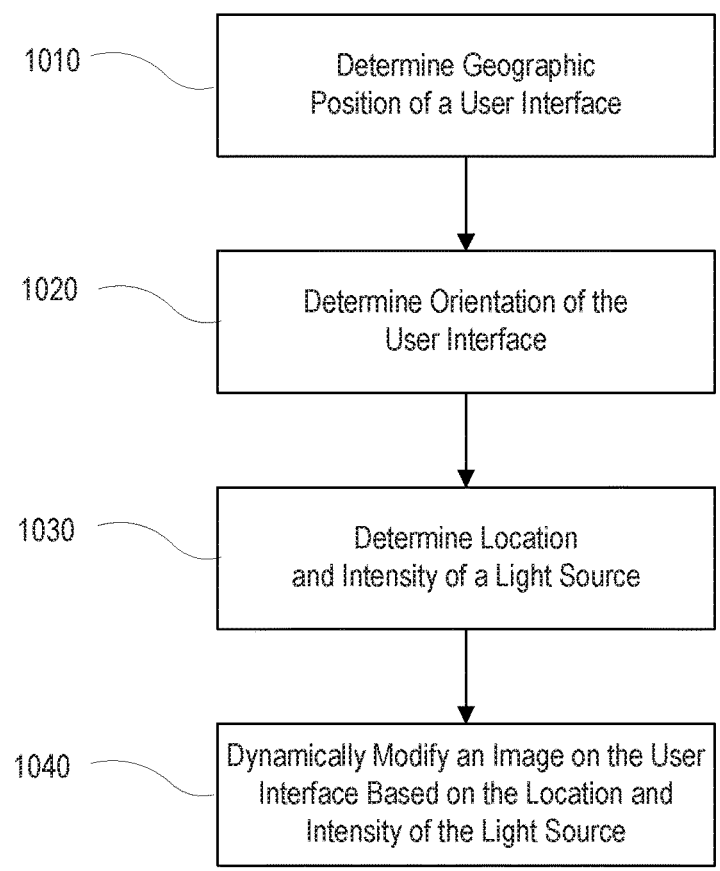
FIG. 4 is a flowchart illustrating an exemplary method that may be performed by the exemplary system of FIG. 3 according to an exemplary embodiment.

FIG. 4 is a flowchart illustrating an exemplary process 1000 that may be performed by exemplary system 51 of FIG. 3.

In Step 1010, one or components of system 51 may determine the geographic position of user interface 10. For example, processing unit 104 may execute GPS software to determine global positioning data of user interface 10, for example, user interface 10 may be currently located at 35.8334° N, 120.2824° W at 4:50 PM PST on Oct. 31, 2015. Based on the GPS data, processing unit 104 may also determine that user interface 10 is in an urban area proximate to large buildings. In some embodiments, processing unit 104 may determine locations and heights of specific buildings that may block light source 80 relative to user interface 10. In another example, processing unit 104 may be configured to determine when user interface 10 is positioned in a wooded area where light source 80 may be blocked, or in an open area where light source 80 may be more direct. Processing unit 104 may also be configured to determine that user interface 10 is positioned, for example, 233 feet above sea level according to either GPS data and/or barometer 64.

In Step 1020, one or more components of system 51 may determine the orientation of user interface 10. In some embodiments, processing unit 104 may execute GPS software to determine orientation data of user interface 10. For example, user interface 10 may be traveling east, such that the z-axis of user interface is currently directed west at an angle of 30° relative to the horizon. Processing unit 104 may, additionally or alternatively, determine the orientation data based on signals generated by at least one of accelerometer 58, gyroscope 60, and compass 62.

In Step 1030, one or more components of system 51 may determine the location and intensity of light source 80. Processing unit 104 may also determine other local atmospheric conditions. For example, processing unit 104 may query weather station 112 to determine elevation angle, α, of light source 80 is about 40° relative to the horizon, and the azimuth angle, β, is about 31 30° relative to the azimuth direction. Processing unit 104 may also determine that it is full sun with a solar intensity of 1370 W/m². Processing unit 104 may also determine that it is an urban area, such that buildings may create obstructions of light source 80 at pre-determined locations of user interface 10.

In Step 1040, one or more components of system 51 may dynamically modify an image on user interface 10 based on the location and intensity of light source 80. In some embodiments, processing unit 104 may be configured to simulate an apparent light source onto user interface 10. For example, processing unit 104 may determine the location and intensity of the apparent light source according to the x-, y-, and z-axes of user interface 10. Processing unit 104 may geometrically convert the elevation angle, α, and azimuth angle, β, of light source 80 to determine a location of an apparent light source according to the x-, y-, and z-axes of user interface 10. Processing unit 104 may simulate lines from the direction of the light source 80 to the edges of features 14, and determine the points that the simulated lines insect the x/y plane of background 12 and/or another feature 14. Processing unit 104 may then connect the intersecting points to create an outline of shadow 30. Processing unit 104 may also retrieve an opacity of shadow 30 from a look-up table according to the determined apparent intensity of 1370 W/m². Processing unit 104 may reduce the opacity of shadow 30 based on when light source 80 is relatively obstructed, for example, when a building is positioned between user interface 10 and light source 80.

Another aspect of the disclosure is directed to a non-transitory computer-readable medium storing instructions which, when executed, cause one or more processors to perform methods of the disclosure. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A computer-implemented method for generating dynamic user interface effects on an image displayed on a user interface, the method comprising:
    receiving, from a first sensor, positioning data indicative of a location of the user interface;
    receiving, from a second sensor, orientation data indicative of an orientation of the user interface;
    determining, by a processor, a location of a light source relative to the user interface based on the positioning data and the orientation data; and
    dynamically modifying, by the processor, the image displayed on the user interface based on the location of the light source.

2. The computer-implemented method of claim 1, wherein dynamically modifying the image comprises simulating a shadow on the user interface based on the location of the light source.

3. The computer-implemented method of claim 2, wherein the simulated shadow extends from a feature depicted on the user interface.

4. The computer-implemented method of claim 3, wherein dynamically modifying the image comprises simulating the shadow based on a predetermined apparent dimension of the feature.

5. The computer-implemented method of claim 4, wherein dynamically modifying the image comprises simulating the shadow based on a predetermined apparent height of the feature.

6. The computer-implemented method of claim 1, further comprising receiving data related to an intensity of the light source and modifying an opacity of the image based on the intensity of the light source.

7. The computer-implemented method of claim 6, further comprising modifying the opacity of the image based on at least one estimated obstruction of the light source.

8. The computer-implemented method of claim 1, further comprising generating the orientation data using at least one of a gyroscope, an accelerometer, or a barometer.

9. The computer-implemented method of clam 1, further comprising determining the location of the light source relative to the user interface with a light sensor.

10. The computer-implemented method of claim 1, wherein modifying the image includes determining a plurality of pixels to be modified based on the location of the light source.

11. A system for generating dynamic user interface effects on an image displayed on a user interface, the system comprising:
    a plurality of sensors configured to determine position data and orientation data indicative of a location and an orientation, respectively, of the user interface;
    an input/output (I/O) interface connected to the plurality of sensors, the I/O interface configured to: receive, from the plurality of sensors, the positioning data and the orientation data;
    a processing unit connected to the I/O interface, the processing unit configured to: receive the position data and orientation data from the I/O interface; determine a location of a light source relative to the user interface based on the positioning data and the orientation data; and dynamically modify the image on the user interface based on the location of the light source.

12. The system of claim 11, wherein the processing unit is configured to simulate a shadow on the user interface based on the location of the light source.

13. The system of claim 12, wherein the simulated shadow extends from a feature depicted on the user interface.

14. The system of claim 13, wherein the processing unit is configured to simulate the shadow based on a predetermined apparent dimension of the feature.

15. The system of claim 11, wherein the processing unit is configured to receive data pertaining to an intensity of the light source and modify an opacity of the image based on the intensity of the light source.

16. The system of claim 15, wherein the processing unit is configured to modify the opacity based on at least one estimated obstruction of the light source.

17. The system of claim 11, wherein the plurality of sensors comprise at least one of a gyroscope, an accelerometer, or a barometer configured to generate the orientation data.

18. The system of claim 11, wherein the processing unit is configured to determine the location of the light source relative to the user interface with a light sensor.

19. The system of claim 11, wherein the processing unit is configured to determine a plurality of pixels to be modified based on the location of the light source.

20. A vehicle comprising:
    a user interface;
    a plurality of sensors configured to determine position data and orientation data indicative of a location and an orientation, respectively, of the user interface;
    an input/output (I/O) interface connected to the plurality of sensors, the I/O interface configured to: receive, from the plurality of sensors, the positioning data and the orientation data;
    a processing unit connected to the I/O interface, the processing unit configured to: receive the position data and orientation data from the I/O interface; determine a location of a light source relative to the user interface based on the positioning data and the orientation data; and dynamically modify an image on the user interface based on the location of the light source.

* * * * *